Aug. 6, 1968  F. C. SCHNABEL  3,395,428
ALL-PURPOSE CLIP
Filed Oct. 18, 1965  6 Sheets-Sheet 1
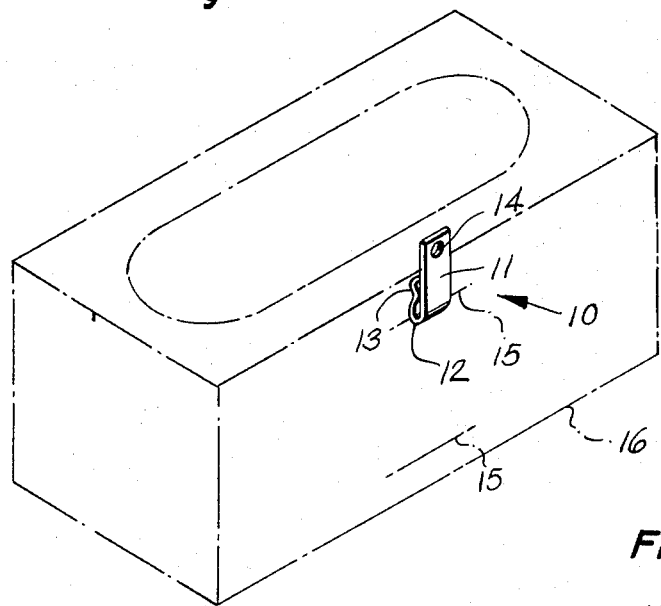
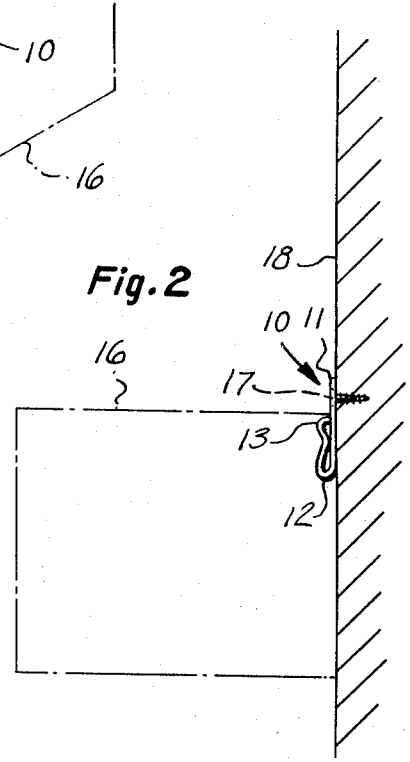
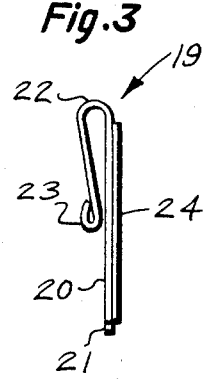
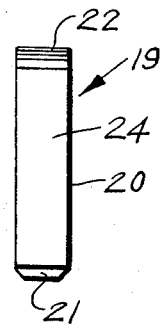
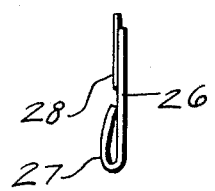
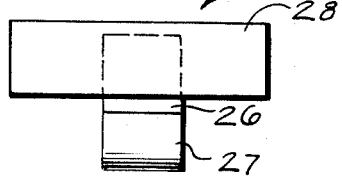
INVENTOR
*Fred C. Schnabel*

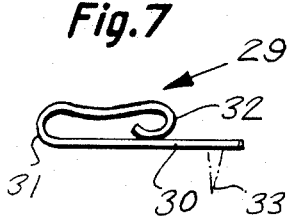
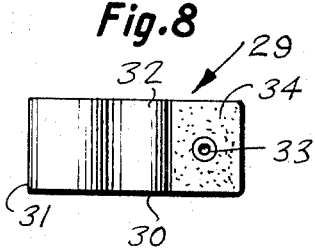
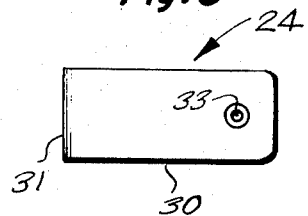
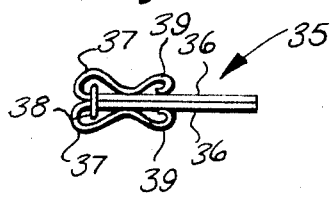
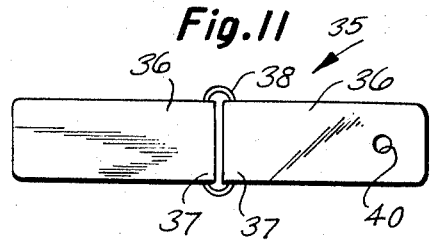
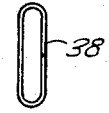
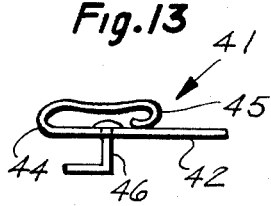
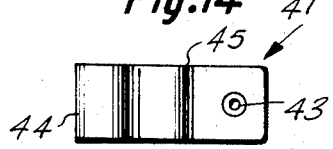
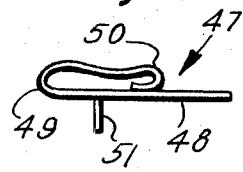
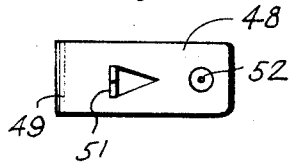
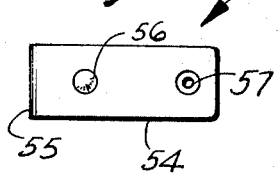
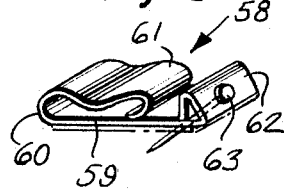
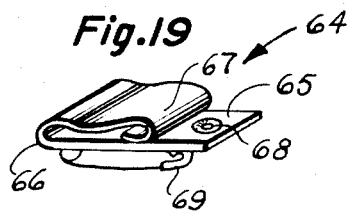
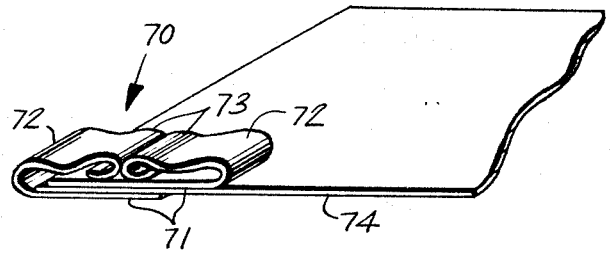
INVENTOR
Fred C. Schnabel Aug. 6, 1968 — F. C. SCHNABEL — 3,395,428
ALL-PURPOSE CLIP
Filed Oct. 18, 1965 — 6 Sheets-Sheet 3

INVENTOR
Fred C. Schnabel

Aug. 6, 1968  F. C. SCHNABEL  3,395,428
ALL-PURPOSE CLIP
Filed Oct. 18, 1965  6 Sheets-Sheet 4

INVENTOR
Fred C. Schnabel

Aug. 6, 1968    F. C. SCHNABEL    3,395,428
ALL-PURPOSE CLIP
Filed Oct. 18, 1965    6 Sheets-Sheet 5
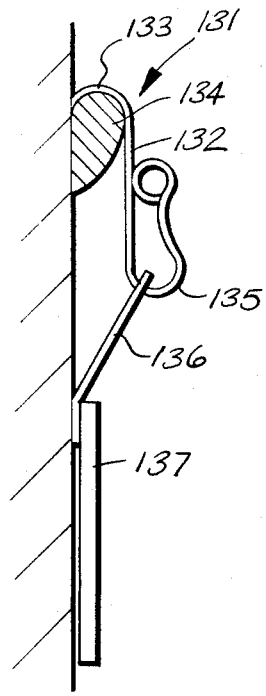
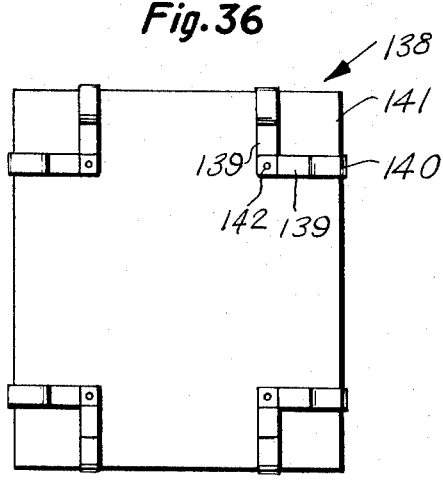
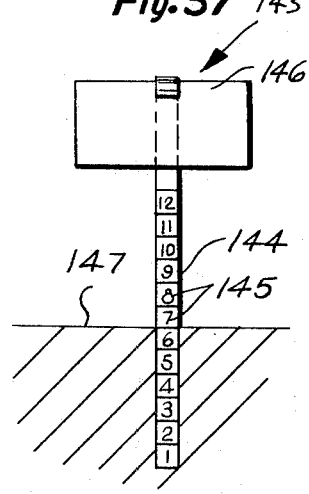
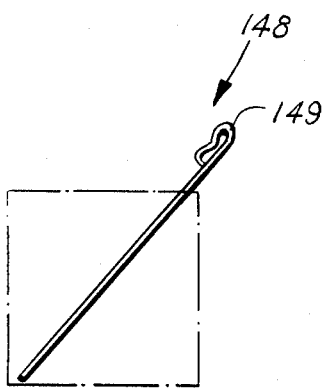
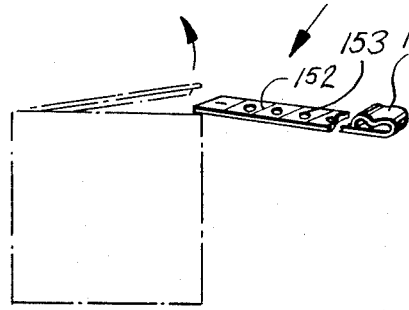
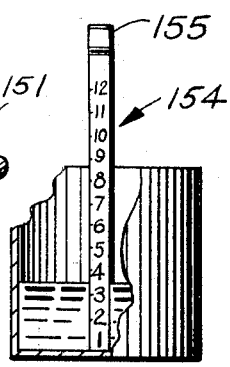
INVENTOR
Fred C. Schnabel Aug. 6, 1968  F. C. SCHNABEL  3,395,428
ALL-PURPOSE CLIP Filed Oct. 18, 1965  6 Sheets-Sheet 6

INVENTOR
Fred C. Schnabel

United States Patent Office 3,395,428
Patented Aug. 6, 1968

3,395,428
ALL PURPOSE CLIP
Fred C. Schnabel, 4820 W. 38th St.,
Minneapolis, Minn. 55416
Filed Oct. 18, 1965, Ser. No. 496,918
1 Claim. (Cl. 24—81)

ABSTRACT OF THE DISCLOSURE

A fastening clip for releasably fastening objects to a fixed support or the like, the clip including a main clip body with a base extension portion constructed for engagement with a fixed support or the like, either by adhesive means, carried thereon, or by screw or other fastening means extensible therethrough and into the fixed support. Another extension portion of the main clip body is resiliently upcurved upon itself to provide a resilient normally closed clamping jaw portion which is adapted to receive papers or other objects to be supported thereby, and to be expanded resiliently on insertion of the papers or other objects for clamping or gripping the same in said jaw portion. Modified forms include a plurality of combined clip members which are resiliently interconnected to form a multiple clip with means for fastening to a support, and also another form including a plurality of clip members which are pivotally interconnected and include means for fastening to a support.

---

This invention relates to supporting devices, and more particularly to a general purpose clip.

It is therefore the main purpose of this invention to provide a clip which will be used for all purposes, such as supporting various types of containers, pictures, displays, wearing apparel hangers, electrical wires, measuring scales, gardening devices, fencing, etc.

Another object of this invention is to provide an all purpose clip which will have various means of securing the clip to any desired surface, such as with adhesives, glue, cement or metal fasteners of various types.

Another object of this invention is to provide an all purpose clip which may be used as paper fasteners to secure a plurality of sheets together.

Another object of this invention is to provide an all purpose clip which will serve as a safety clip to cover the edge of razor blades and the like.

Still another object of this invention is to provide an all purpose clip which will be suitable with depending marking or scribing devices from a suitable surface.

A still further object of this invention is to provide an all purpose clip which will serve as a decorative article while functioning as a practical support for various items.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claim.

In the drawing:

FIGURE 1 is a perspective view of this invention shown installed in a box of disposable tissues.

FIGURE 2 is a side view of this invention shown secured to a wall and supporting a box of tissues.

FIGURE 3 is a side view showing a modified form of this invention.

FIGURE 4 is a rear view of FIGURE 3.

FIGURE 5 is a front view showing another modified form of the invention.

FIGURE 6 is a side view of FIGURE 5.

FIGURE 7 is a side view showing another modified form of this invention.

FIGURE 8 is a top plan view of FIGURE 7.

FIGURE 9 is a bottom plan view of FIGURE 7.

FIGURE 10 is a side view showing another modified form of this invention.

FIGURE 11 is a plan view of FIGURE 10 shown in the open position.

FIGURE 12 is a plan view of the connecting link shown removed from FIGURE 11.

FIGURE 13 is a side view showing another modified form of this invention.

FIGURE 14 is a top plan view of FIGURE 13.

FIGURE 15 is a side view of another modified form of this invention.

FIGURE 16 is a bottom plan view of FIGURE 15.

FIGURE 17 is a bottom plan view showing another modified form of this invention.

FIGURE 18 is a perspective view showing another modified form of this invention.

FIGURE 19 is a perspective view showing a further modified form of this invention.

FIGURE 20 is a perspective view showing another modified form of the invention.

FIGURE 35 is a side view showing another modified form of the invention.

FIGURE 36 is a plan view showing another modified form.

FIGURE 37 is a front view showing another modified form of the invention.

FIGURES 38, 39 and 40 show other modified forms of the invention.

Figure 21:
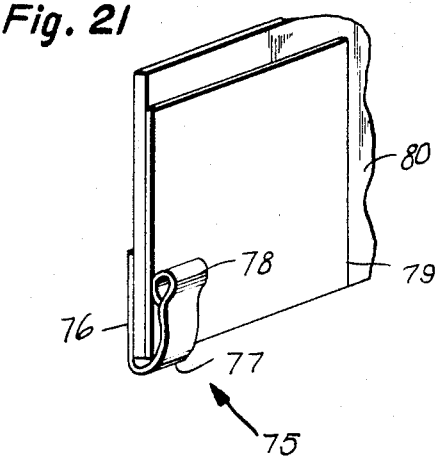
FIGURE 21 is a perspective view showing another modified form of the invention.

According to this invention, an all purpose clip 10 is provided with an elongated flat main body 11 which is made of metal or other suitable material, the end 12 which is bent arcuately to form a semi-loop 13 which springingly urges against main body 11. A counter sunk opening 14 through the end of main body 11 provides a means of suspending clip 10 at any desired location. A semi-loop 13 is received within an elongated slit 15 of a tissue box 16 and a chrome plated screw 17 is received within opening 14 and thus allows tissue box 16 to be supported on a tile wall 18 or other wall surface. All purpose clip 10 may be secured to wall 18 by adhesive means if desired. When the main body 11 of clip 10 is provided with adhesive (not shown), the peel or liner is used to rub the wall's surface where clip 10 will be mounted until the surface is warm and when clip 10 is placed in position it will remain in place after a few seconds.

Looking now at FIGURE 3 of the drawing, one will see a modified clip 19 having an elongated flat main body 20 which is provided with a non-marring beveled end 21. Main body 20 is bent at end 22 and is provided with an outwardly extending loop 23 which springingly engages main body 20 in order to support various items. An adhesive 24 is applied to the back of clip 19 during the manufacture thereof and serves as a means of adhering clip 19 to any surface desired.

Looking now at FIGURE 5 of the drawing, one will see a modified form of clip 25 having a flat main body 26 which is bent into a springy loop 27 which will support various items placed thereupon. A rectangular shaped length of tape 28 on the other end of the main body 26 provides a means of supporting it on a wall or other surface.

Looking now at FIGURE 7 of the drawing, a modified form of clip 29 is provided with a flat main body 30 having an end 31 bent upward to form a springy loop 32 which will springingly engage and urge against main body 30. As molded or punched prong 33 provides a means of securing clip 29 to any desired surface. A roughened surface 34 of clip 29 provides non-slipping finger grip means for urging prong 33 into a surface.

Looking now at FIGURE 10 of the drawing, one will see a double clip 35 having elongated flat main body members 36 which are bent to form a loop 37 which receives an elongated wire link 38 or strong rubber band which secures the two main body members 36 together. A loop 39 on each of the main body members 36 provides a means of springingly and clampingly engaging various objects on either side of double clip 35 and the double clip 35 may be opened as shown in FIGURE 11 of the drawing.

It will be noted that an opening 40 through one of the main body members 36 of double clip 35 provides a means of supporting it upon any surface by receiving a suitable fastener (not shown).

Looking now at FIGURE 13 of the drawing, one will see a modified form of clip 41 having an elongated flat main body 42 which is provided with an opening 43 for emergency use in supporting clip 41. An end 44 is bent to form an open loop 45 which springingly engages the main body member 42 thus securing paper or other objects within clip 41. An L-shaped pin 46 extends from the main body member 42 and may be used on peg boards.

It will be noted that pin 46 may be free to rotate or may be soldered.

Looking now at FIGURE 15 of the drawing, one will see a modified form of clip 47 having a main body 48 which has a bent end 49. A loop 50 which is open springingly engages main body 48 of clip 47 and a triangular prong 51 is die-punched from main body 48 so that it extends away from main body 48 and provides a means of securing clip 47 to a surface. The main body 48 of clip 47 is also provided with an opening 52 which serves as a secondary means for securing it to a surface.

Looking now at FIGURE 17 of the drawing, one will see a modified form of clip 53 having a flat main body 54 and a bent end 55. A conical prong 56 extends from main body 54 and an opening 57 provides a secondary means of mounting clip 53 to a surface.

Looking now at FIGURE 18, of the drawing one will see a modified form of clip 58 having a flat main body 59 and a bent end 60 which is terminated by loop 61 which is open and loop 61 springingly engages main body 59. Clip 58 is also provided with a triangular shaped loop 62 which receives a nail 63 which will allow clip 58 to be secured to a surface. The triangular loop 62 provides stiffening means for the end receiving nail 63 and thus provides firm support for clip 58.

Looking now at FIGURE 19 of the drawing, one will see another modified form of clip 64 having a flat main body 65 and a bent end 66 which forms a loop 67 which springingly engages with main body 65. An opening 68 through main body 65 provides a means of securing clip 64 to a surface and a safety pin 69 is secured to the back of main body 65 and may be used to hold fabrics or other materials.

Looking now at FIGURE 20, of the drawing, one will see a modified form of double clip 70 having a pair of main body members 71 which are flat in shape and are bent at ends 72 to form open loops 73 which are secured to each other and are oppositely faced to each other and provides a means of urging main body member 70 one against the sides of paper 74.

Looking now at FIGURE 21 of the drawing, one will see a modified form of clip 75 having a flat main body 76. The end 77 is bent to form a loop 78 which is closed and springingly urges against main body 76 and may be used to clampingly secure paper 79 against a sun visor 80 of a vehicle.

Figure 22:
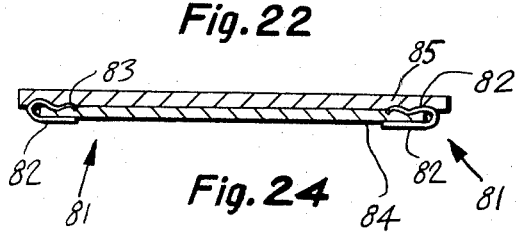
FIGURE 22 is a cross-sectional view of a rug showing a modified form of the invention applied thereto.
Figure 24:
FIGURE 24 is a side view showing another modified form of the invention.

Looking now at FIGURE 22 of the drawing a modified form of clip 81 having a main body 82 which is bent to form a corrugated leg 83 which grippingly engages and springingly holds pad 84 beneath rug 85 and by adhesive means a plurality of lips 81 serves to hold rug 85 in place.

Figure 23:
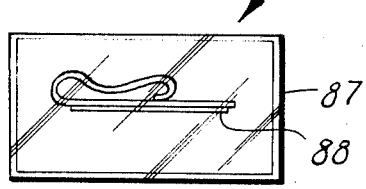
FIGURE 23 is a side view showing another modified form of the invention.

Looking now at FIGURE 23 of the drawing, one will see a modified form of clip 86 which is the same as heretofore described of the main embodiment of this invention, with the exception that cellophane 87 forming an envelope contains clip 86 to protect the adhesive 88 until clip 86 is ready for use.

Figure 25:
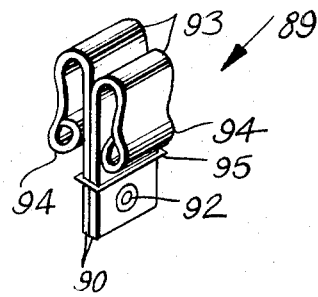
FIGURE 25 is a perspective view showing another modified form of the invention.

Looking now at FIGURE 25 of the drawing, one will see a double clip 89 having main body members 90 which lay flat against each other. An opening 92 through main body members 90 provides a means for securing double clip 89 to any surface desired and ends 93 are bent to form a closed loop 94 which springingly urge against main body members 90 and provide a means of clampingly holding various articles being received between loop 94 and main body members 90. A square link 95 received around the main body members 90 thus secures them together to form a double clip.

Figure 26:
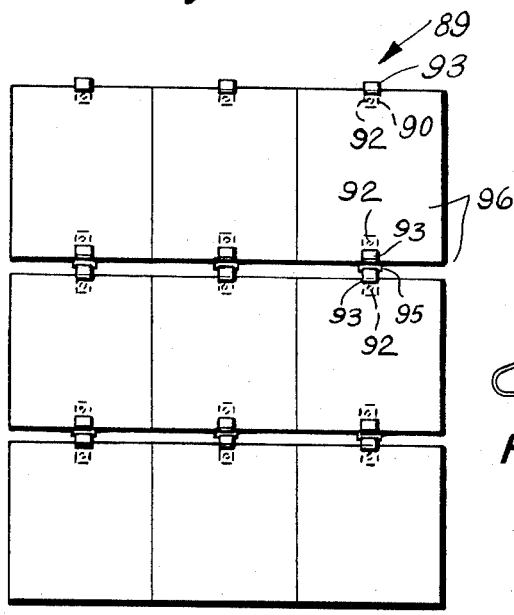
FIGURE 26 is a vertical front view showing an application of FIGURE 25.

Double clip 89 when used in plurality provides a means of displaying greeting cards 96 or other material as will be seen in FIGURE 26 of the drawing.

Figure 27:
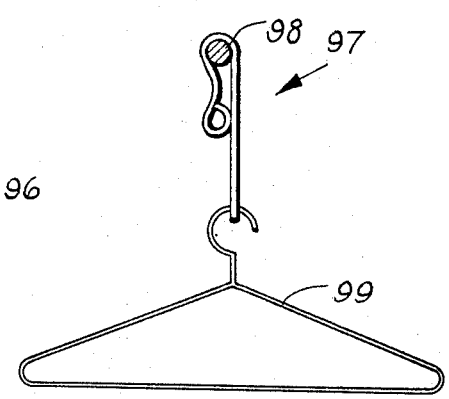
FIGURE 27 is a side view showing an application of this invention.
Figure 28:
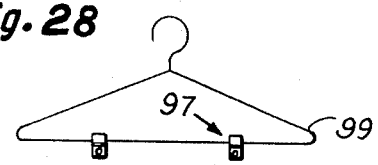
FIGURE 28 is a front view showing another application of this invention.

Looking now at FIGURE 27, of the drawing one will see a plastic clip 97 in another application of this invention. Clip 97 is supported from a rod 98 and a coat hanger 99 is suspended from within the lower extremity of plastic clip 97.

Figure 29:
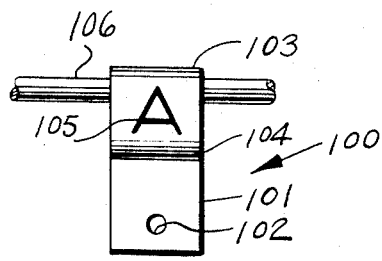
FIGURE 29 is a front view showing another modified form of this invention.

Looking now at FIGURE 29 of the drawing, one will see a modified form of clip 100 having a flat main body 101 which is provided with an opening 102 for receiving various items. The end 103 is bent over and forms a loop 104. A letter character 105 or an advertisement is adhered to clip 100. Clip 100 may be suspended from a line 106 or rod by means of the bent ends 103.

Figure 30:
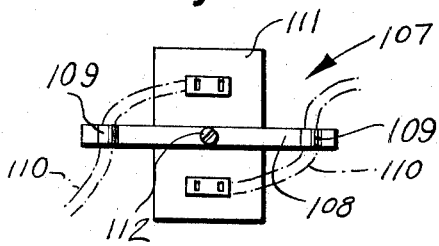
FIGURE 30 is a front view showing another modified form of the invention.

Looking now at FIGURE 30 of the drawing, one will see a modified form of clip 107 having an elongated flat body 108 having spaced apart concave areas 109 which receive and hold line cords 110 which are plugged into outlet 111. A screw fastener 112 through the center of the elongated body 108 secures clip 107 to the electrical outlet 111.

Figure 31:
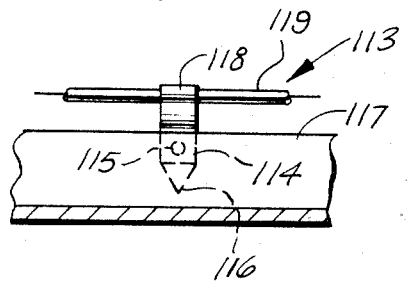
FIGURE 31 is a front view showing another modified form of the invention.

Looking now at FIGURE 31 of the drawing a modified form of clip 113 is provided with a main body 114 which is flat and has a tapered point 116 which enables clip 113 to be driven into a floor rail 117 thus securing clip 113 in position. A looped end 118 of clip 113 clampingly engages electrical wire 119 and supports it above floor rail 117.

Figure 32:
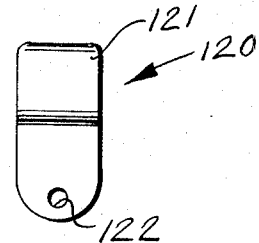
FIGURE 32 is a plan view showing a modified clip for clothes lines.

Looking now at FIGURE 32 of the drawing one will see a modified form of clip 120 for clothes lines and the like. Clip 120 is provided with a looped end 121 and an opening 122 from which various articles may be suspended.

Figure 33:
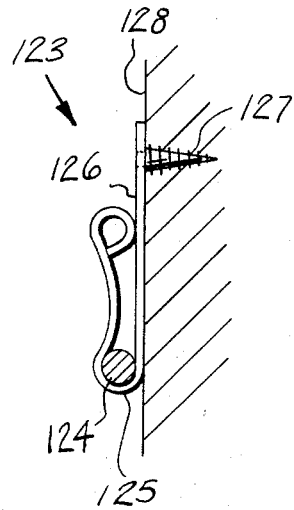
FIGURE 33 is a side view showing another modified form of the invention.

Looking now at FIGURE 33 of the drawing, one will see another modified form of clip 123 which receives a line 124 within the loop 125. The looped portion of clip 123 springingly engages against the main body 126 of clip 123. A screw 127 secured to clip 123 provides a means of securing clip 123 to wall 128.

Figure 34:
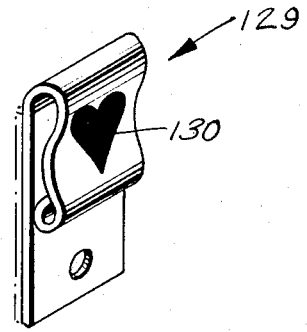
FIGURE 34 is a perspective view showing another modified form of the invention.

Looking now at FIGURE 34 of the drawing, one will see a modified form of clip 129 upon which a playing card heart design 130 is inscribed. Clip 129 may be used for playing cards or supporting a note or pad.

It will be noted that various designs may be inscribed upon clip 129 and various card suits as well.

Looking now at FIGURE 35 of the drawing, one will see a modified form of clip 131 which is provided with a main body 132 of flat shape. One end of clip 131 is provided with an arcuate hook 133 which engages over wall molding 134 and thus the lower portion of clip 131 depends from wall molding 134. The end 135 forms a loop and receives and supports picture wire 136 which is attached to pictures frame 137.

Looking now at FIGURE 36 of the drawing, one will see a modified form of clip 138 which has pivotable main body 139 having a bent end 140 which receives and springingly clamps paper 141. The main bodies 139 of clip 138 receive a pivot pin 142 thus allowing them to be pivoted and easily disengaged from paper 141.

Looking now at FIGURE 37 of the drawing, one will see a modified form of clip 143 consisting of a flat elongated main body 144 which is calibrated with a plurality of numerical characters 145 to indicate inches. A seed or flower package 146 is received in clipped end of clip 143 and the main body 144 may be inserted into the ground 147 thus supporting the seed or flower package 146.

Looking now at FIGURE 38 of the drawing, one will see a clip 148 which is elongated and may be used to stir paint or the like and the end 149 may receive a fastener on a wall to thus depend clip 148 therefrom.

The clip end 149 may be held in the hand to thus allow easy stirring of paint or other liquid.

Looking now at FIGURE 39 of the drawing, one will see a modified form of clip 150 having a clamping end 151. A plurality of spaced apart graduations 152 provides measuring means for various uses and the end of clip 150 may be used to open a paint can as shown. Clip 150 is also supplied with a plurality of spaced apart openings which may be used for any number of purposes.

Looking now at FIGURE 40 of the drawing, one will see a clip 154 which is graduated to measure the height of liquid or the material and at end 155 provides spring clamping means for holding various articles such as heretofore was described in the similar embodiment.

Figure 41:
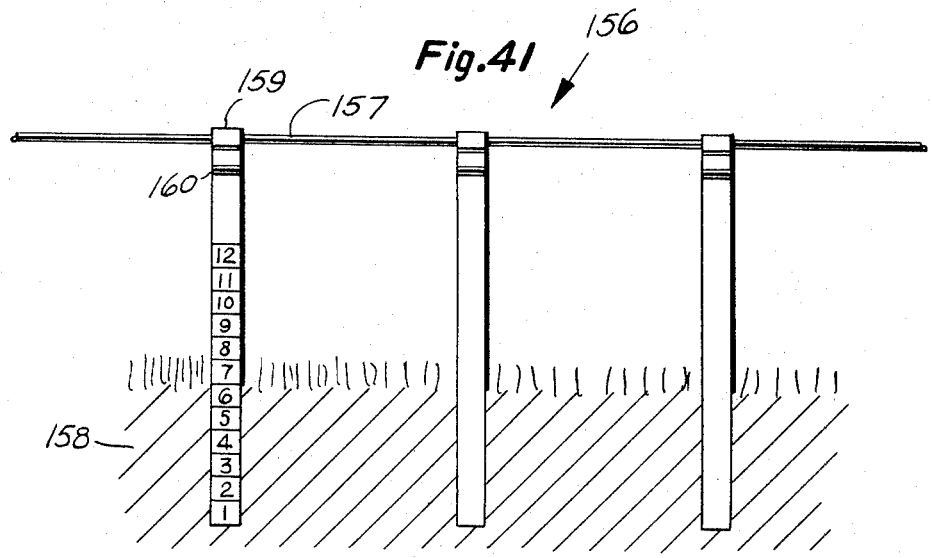
FIGURE 41 is a front view showing another modified form of the invention.

Looking now at FIGURE 41 of the drawing, one will see another application 156 of the above mentioned embodiment of this invention and a wire 157 or a line is clampingly engaged within the loop 159 while the loop 160 may be used to support various papers etc. It will be noted that again the calibrations shown on this particular application 156 of the invention may be used to measure the height desired of wire 157 from the ground 158.

Figure 42:
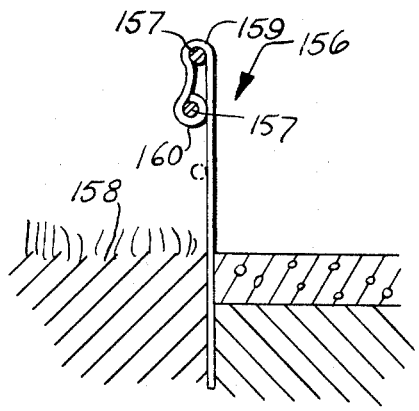
FIGURE 42 is a side view showing another modified form of the invention.

Looking now at FIGURE 42, one will see the manner in which the wire 157 is employed and inserted.

Figure 43:
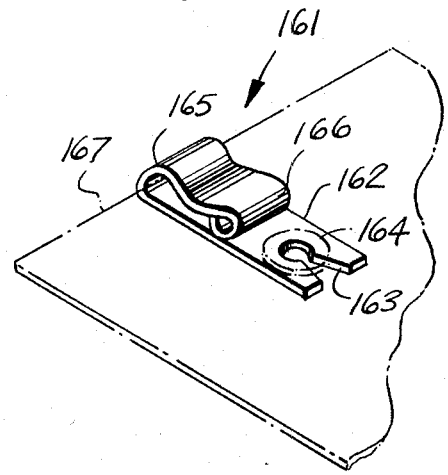
FIGURE 43 is a perspective view showing still another modified form of the invention.

Looking now at FIGURE 43 of the drawing, one will see still another modified form of clip 61 having an elongated main body 162 which is provided with a notch 163 which allows the main body 162 to engage a shirt button 164 (shown in phantom lines) and the end 165 is bent to form a springy loop 166 which receives and clampingly engages a napkin 167, thus supporting the napkin 167 from the wearer shirt (not shown).

Figure 44:
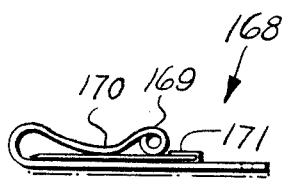
FIGURE 44 is a side view showing a further modified form of the invention.

Looking now at FIGURE 44 of the drawing, one will see a further application 168 with the loop 169 and the curved portion 170 springingly engaging razor blade 171 thus protecting anyone from being accidentally injured by razor blade 171. It will be noted that alphabetical or numercial characters may be produced by painting, stamping, molding (plastic) or stenciled and the surfaces may be serrated on the springy gripping areas and also along the edges of these clips. The surfaces may be dimpled or roughened to increase the holding power, particularly when the structures are made of plastic.

It shall further be noted that common adhesive or foam adhesive applied to the various forms of this invention will tend to keep the wall from possibly cracking when nails or other fasteners are pounded in by hammer or other tool. The walls must be cleaned before the adhesive clip is used and the adhesive clip provides a hand means of allowing the clip to be moved from place to place on the wall until the exact location desired is obtained. In order to hang a picture frame a triangular prong die-punched in one leg of this invention would allow for a flat headed screw which is secured to the back of the picture frame to be snapped in thus allowing the frame to be easily hung from a clip.

Adhesive may also be applied to the clip which will retain a razor blade or other instrument. The pointed end of clip may also be used to remove staples from sheets of paper stapled together.

An adhesive clip as will become obvious, eliminated the nail or screw due to the fact that the back side of the elongated flat main body enables the clip to have a strong holding power through a greater area of adhesive and as will be seen in FIGURE 1 one or the other clip 15 may be used to support a box of tissues. Pushing in along the dotted line of slot 15 breaks the slot 15 and the lower portion of the slit is pressed downward to snap the tissue box over the clip 10. Clip 10 may be fastened to the wall several times by means of the adhesive until the correct location desired is obtained, after which a screw or other type fastener may be used. In order to mount the adhesive coated clip, the clip is moistened at the adhesive with water by wetting the fingers and a cement or glue capsule may be used for quick-drying mounting of clip 10.

I claim:

1. A clip adapted to secure several papers together comprising a pair of generally J-shaped resilient clips secured in abutting back to back relationship of their longer arms by resilient means of wire like configuration extending thru the bights of the clips and around the longer arms thereof, said means lying in a plane perpendicular to the plane of the clips so that the clips may be pivoted about their bights so as to be in aligned relationship.

References Cited

UNITED STATES PATENTS

| | | |
|---|---|---|
| 1,035,319 | 8/1912 | Cormier. |
| 1,308,066 | 7/1919 | Hayes. |
| 1,730,959 | 10/1929 | Warfield. |
| 1,817,424 | 8/1931 | Smiley. |
| 1,876,464 | 9/1932 | Miller. |
| 2,080,990 | 5/1937 | Weekley. |
| 2,196,965 | 4/1940 | Bryan. |
| 2,723,815 | 11/1955 | Browning. |
| 3,016,224 | 1/1962 | Hall. |
| 689,689 | 12/1901 | Parker et al. |

(Other references on following page)

UNITED STATES PATENTS

| | | | |
|---|---|---|---|
| 1,028,560 | 6/1912 | Farrah | 40—144 |
| 1,105,542 | 7/1914 | Tobie | 24—259 XR |
| 1,154,371 | 9/1915 | Burke. | |
| 1,215,058 | 2/1917 | Pound | 24—259 |
| 1,371,811 | 3/1921 | Reese | 24—81 |
| 1,491,286 | 4/1924 | Calhoun. | |
| 1,648,408 | 11/1927 | Kumagai. | |
| 1,693,098 | 11/1928 | Taylor. | |
| 2,031,147 | 2/1936 | Doolin | 24—259 |
| 2,308,166 | 1/1943 | Fulton | 24—73 XR |
| 2,592,362 | 4/1952 | Weeks | 24—81 |
| 2,614,570 | 10/1952 | Hall | 24—255 XR |
| 2,618,086 | 11/1952 | Komorous | 24—259 XR |
| 2,923,760 | 2/1960 | Famely | 24—255 XR |
| 3,315,325 | 4/1967 | Cornelius | 24—66 |

FOREIGN PATENTS

| | | |
|---|---|---|
| 418,825 | 10/1910 | France. |
| 7,289 | 9/1927 | Australia. |
| 1,001,085 | 10/1951 | France. |

DONALD A. GRIFFIN, *Primary Examiner.*